(12) United States Patent
Jadhav et al.

(10) Patent No.: US 10,474,665 B2
(45) Date of Patent: Nov. 12, 2019

(54) SYSTEMS AND METHODS FOR GENERATING BLUEPRINTS FOR ENTERPRISES

(71) Applicant: Tata Consultancy Services Limited, Mumbai (IN)

(72) Inventors: Sachin Sadashiv Jadhav, Pune (IN); Maitreya Natu, Pune (IN); Vaishali Paithankar Sadaphal, Pune (IN); Vaishali Shashank Kulkarni, Pune (IN); Harrick Mayank Vin, Pune (IN); Rahul Ramesh Kelkar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 575 days.

(21) Appl. No.: 15/261,597

(22) Filed: Sep. 9, 2016

(65) Prior Publication Data
US 2017/0228413 A1    Aug. 10, 2017

(30) Foreign Application Priority Data
Feb. 10, 2016  (IN) .............................. 201621004796

(51) Int. Cl.
*G06F 16/20* (2019.01)
*G06F 16/23* (2019.01)
*G06F 16/2457* (2019.01)

(52) U.S. Cl.
CPC .... *G06F 16/2365* (2019.01); *G06F 16/24578* (2019.01)

(58) Field of Classification Search
None
See application file for complete search history.

(56) References Cited

U.S. PATENT DOCUMENTS 7,472,374 B1 * 12/2008 Dillman ................... G06F 8/10
                                                     717/102
2008/0046299 A1 * 2/2008 Simons .............. G06Q 10/0639
                                                     705/7.23

* cited by examiner

*Primary Examiner* — Belix M Ortiz Ditren
(74) *Attorney, Agent, or Firm* — Finnegan, Henderson, Farabow, Garrett & Dunner LLP

(57) ABSTRACT

Systems and methods for generating a blueprint for an enterprise is provided. The system obtains information pertaining to an enterprise from data sources, extracts entities from the information, and identifies relationships across the entities, performs conflict resolution check on the information received from the data sources based on pre-defined rules, identifies one or more missing links in the information. The system further computes a completeness score for the information based on at least one of the conflict resolution check and the missing links, and generates a blueprint of the information and the one or more entities for the enterprise. Authentic data sources are identified from the data sources based on at least one of assigned weight, and one or more instances of, and contribution by, the data sources in the information. The completeness score is computed based on the instances and contribution of the sources in the information.

17 Claims, 8 Drawing Sheets

| Summary - Credit authority Application | |
|---|---|
| Entity | Count |
| pdn | 96 |
| component | 39 |
| idn | 124 |
| service | 1 |

| Attributes - Credit authority Application | |
|---|---|
| Attribute | Value |
| id | 840 |
| nodename | Credit authority |
| Display Name | Credit authority |
| Sources | rainbow, gel, ram |
| Service Name | Credit authority |
| Catalogue ID | 7911 |
| Locality | global |
| Unit | corporate banking ats |

FIG. 5B

| ENTITY | NODE | ATTRIBUTE NAME | RAINBOW | RAM | GEL |
|---|---|---|---|---|---|
| ldn | mm1sdsd | osversion | Win 10 | RAM | Linux |

| ENTITY | NODE | ATTRIBUTE NAME | RAINBOW | RAM | GEL |
|---|---|---|---|---|---|
| pdn | RLTHDTVRAP12 | manufacturer | HP | RAM | DELL |

| ENTITY | NODE | ATTRIBUTE NAME | RAINBOW | RAM | GEL |
|---|---|---|---|---|---|
| Service | POS | Business Area | Credit Cards | Debit Cards | |

FIG. 7

SYSTEMS AND METHODS FOR GENERATING BLUEPRINTS FOR ENTERPRISES

PRIORITY CLAIM

This U.S. patent application claims priority under 35 U.S.C. § 119 to: India Application No. 201621004796, filed on Feb. 10, 2016. The entire contents of the aforementioned application are incorporated herein by reference.

TECHNICAL FIELD

This disclosure relates generally to blueprint generation systems, and more particularly to systems and methods for generating blueprints for enterprises.

BACKGROUND

Most organizations find it difficult to construct a complete, enterprise-wide, and accurate configuration database due to various challenges. One of the primary challenges faced by such organizations involves a scenario when information is scattered in a large number of diverse data sources. Data is captured from discovery tools, monitoring tools, or manually maintained datasheets. Such information are obtained from data sources and may be incomplete and contain partial information of the system components and dependencies. Different data sources often contain conflicting information about dependencies or component attributes. Further, systems keep changing with addition, removal, and upgrades of system components, thereby posing several challenges in keeping configuration database up-to-date. This leads to ineffective resource utilization.

SUMMARY

Embodiments of the present disclosure present technological improvements as solutions to one or more of the above-mentioned technical problems recognized by the inventors in conventional systems. For example, in one aspect, a processor-implemented method is provided. The method comprising obtaining information pertaining to an enterprise from one or more data sources; extracting one or more entities from the information, and identifying relationships across the one or more entities; performing conflict resolution check on the information received from the one or more data sources based on one or more pre-defined rules; identifying one or more missing links in the information; computing a completeness score for the information based on at least one of the conflict resolution check and the one or more missing links; and generating a blueprint of the information and the one or more entities for the enterprise.

In an embodiment, the step of performing conflict resolution check on the information received from the one or more data sources based on one or more pre-defined rules comprises computing weight and assigning the weight to the one or more data sources based on the information; and identifying one or more authentic data sources from the one or more data sources based on the weight. In another embodiment, the step of performing conflict resolution check on the information comprises identifying one or more attributes associated with the information and the one or more entities. In an embodiment, the step of identifying one or more authentic data sources from the one or more data sources based on the weight comprises identifying at least one of one or more instances of, and contribution by, the one or more data sources in the information to obtain the one or more authentic data sources.

In an embodiment, the completeness score for the information is based the one or more instances of, and contribution by, the one or more data sources in the information. The method may further include generating a feedback report and communicating the feedback report to the one or more data sources. The feedback report is based on at least one of the completeness score computed for the information, relationships across the one or more entities, one or more instances of, and contribution by the one or more data sources. The processor-implemented method may further comprise updating the blueprint based on subsequent information received from a set of data sources, wherein the set of data sources comprises at least a portion of the one or more data sources.

In another aspect, a processor-implemented system is provided. The system comprising a memory storing instructions; a communication network interface; and one or more hardware processors coupled to the memory, wherein the one or more hardware processors configured by the instructions to: obtain information pertaining to an enterprise from one or more data sources; extract one or more entities from the information, and identify relationships across the one or more entities, perform conflict resolution check on the information received from the one or more data sources based on one or more pre-defined rules, identify one or more missing links in the information, compute a completeness score for the information based on at least one of the conflict resolution check and the one or more missing links, and generate a blueprint of the information and the one or more entities for the enterprise.

In an embodiment, the conflict resolution check is performed by computing weight and assigning the weight to the one or more data sources based on the information; and identifying one or more authentic data sources from the one or more data sources based on the weight. In an embodiment, the one or more authentic data sources are identified by identifying at least one of one or more instances of, and contribution by, the one or more data sources in the information to obtain the one or more authentic data sources. In an embodiment, the completeness score for the information is based the one or more instances of, and contribution by, the one or more data sources in the information.

The one or more hardware processors are further configured by the instructions to generate a feedback report and communicating the feedback report to the one or more data sources. In an embodiment, the feedback report is based on at least one of the completeness score computed for the information, relationships across the one or more entities, one or more instances of, and contribution by the one or more data sources. In an embodiment, the one or more hardware processors are further configured by the instructions to update the blueprint based on subsequent information received from a set of data sources, wherein the set of data sources comprises at least a portion of the one or more data sources.

In yet another aspect, one or more non-transitory machine readable information storage mediums comprising one or more instructions is provided. The instructions when executed by one or more hardware processors causes obtaining information pertaining to an enterprise from one or more data sources; extracting one or more entities from the information, and identifying relationships across the one or more entities; performing conflict resolution check on the information received from the one or more data sources based on one or more pre-defined rules; identifying one or more missing links in the information; computing a completeness score for the information based on at least one of the conflict resolution check and the one or more missing links; and generating a blueprint of the information and the one or more entities for the enterprise.

In an embodiment, the step of performing conflict resolution check on the information received from the one or more data sources based on one or more pre-defined rules comprises computing weight and assigning the weight to the one or more data sources based on the information; and identifying one or more authentic data sources from the one or more data sources based on the weight. In another embodiment, the step of performing conflict resolution check on the information comprises identifying one or more attributes associated with the information and the one or more entities. In an embodiment, the step of identifying one or more authentic data sources from the one or more data sources based on the weight comprises identifying at least one of one or more instances of, and contribution by, the one or more data sources in the information to obtain the one or more authentic data sources.

In an embodiment, the completeness score for the information is based the one or more instances of, and contribution by, the one or more data sources in the information. The method may further include generating a feedback report and communicating the feedback report to the one or more data sources. The feedback report is based on at least one of the completeness score computed for the information, relationships across the one or more entities, one or more instances of, and contribution by the one or more data sources. The processor-implemented method may further comprise updating the blueprint based on subsequent information received from a set of data sources, wherein the set of data sources comprises at least a portion of the one or more data sources.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5B depicts summary and attributes of the application according to an embodiment of the present disclosure;

FIG. 7 is a table view illustrating identifying attribute conflicts by performing conflict resolution check using the blueprint generation system of FIG. 1 according to an embodiment of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
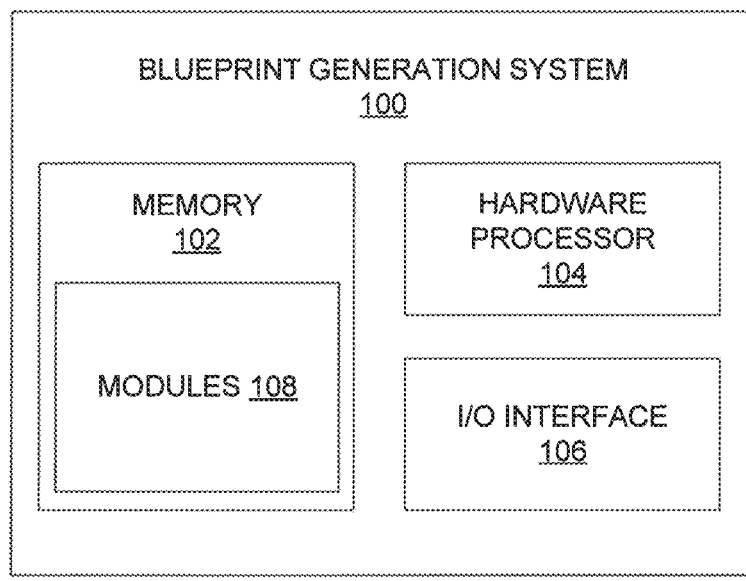
FIG. 1 is a block diagram of a blueprint generation system according to an embodiment of the present disclosure.

FIG. 1 is a block diagram of a blueprint generation system 100 according to an embodiment of the present disclosure. The terms "blueprint generation system" and "system" may be interchangeably used herein after. The system 100 comprises a memory 102, a hardware processor 104, and an input/output (I/O) interface 106. Although the exemplary block diagram and the associated description refers to a memory and a hardware processor, it may be understood that one or more memory units and one or more hardware processors may be comprised in the blueprint generation system 100. The memory 102 further includes one or more functional modules. The memory 102, the hardware processor 104, the input/output (I/O) interface 106, and/or the modules may be coupled by a system bus or a similar mechanism. The blueprint generation system 100 generates one or more blueprints for a given enterprise (e.g., an information technology organization). The one or more blueprints are generated by the system 100 based on information received from one or more data sources (not shown in FIG. 1) through one or more networks (not shown in FIG. 1).

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, information received from the one or more data sources (not shown in FIG. 1) through the one or more networks (not shown in FIG. 1). The one or more data sources for example, may comprise but are not limited to internal sources of the enterprise (or enterprises), social media, and the like.

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

Figure 2:
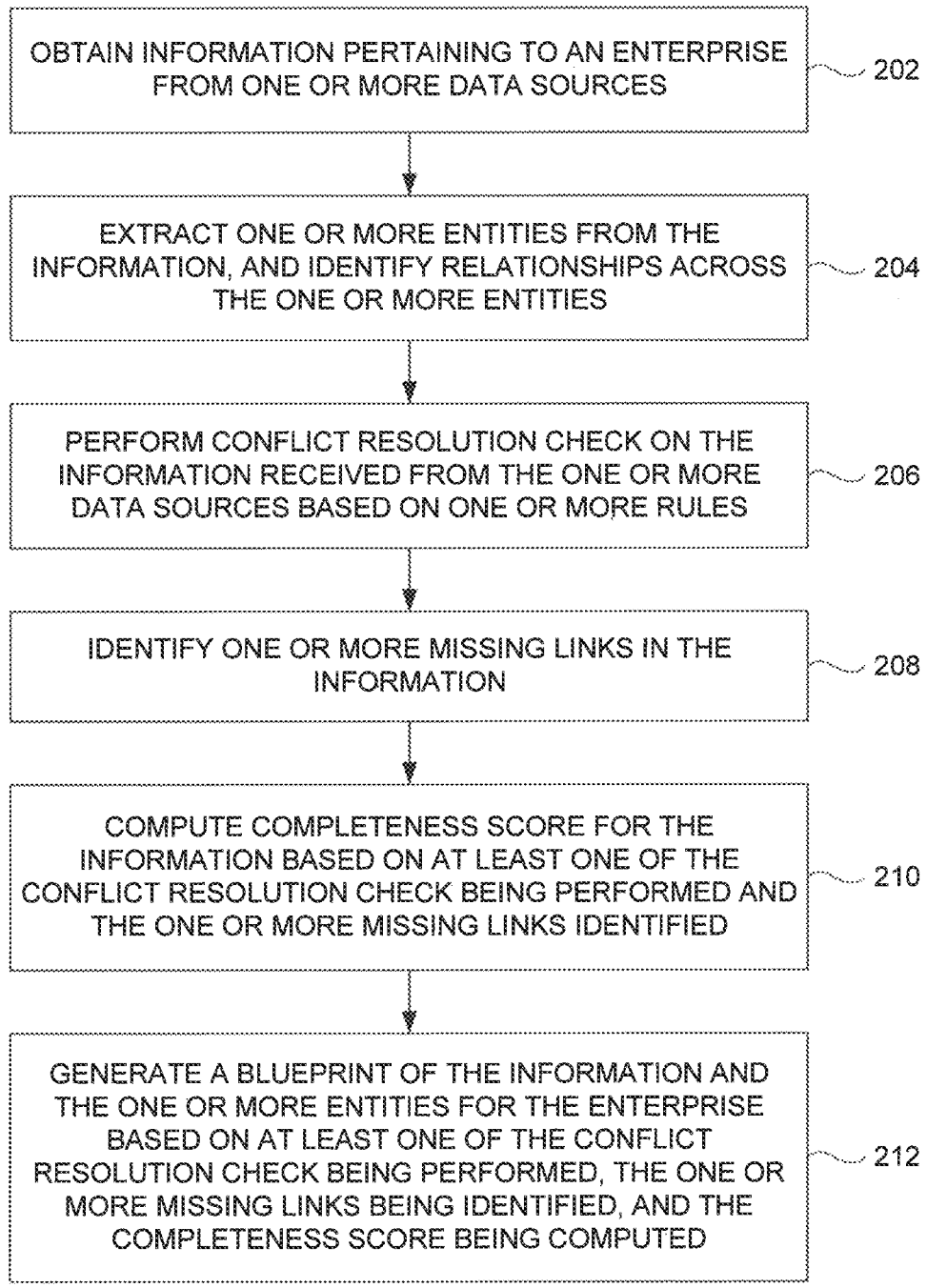
FIG. 2 illustrates a flow chart of a computer implemented method for blueprint generation using the blueprint generation system of FIG. 1, in accordance with an embodiment of the present disclosure.

FIG. 2 illustrates a flow chart of a computer implemented method for blueprint generation using the blueprint generation system 100 of FIG. 1, in accordance with an embodiment of the present disclosure. The steps of the method of the present disclosure will now be explained with reference to the components of the system 100 as depicted in FIG. 1. The hardware processor 104 is configured by the instructions stored in the memory 102. The hardware processor 104 when configured by the instructions enables blueprint generation as described hereinafter. In an embodiment, at step 202, information pertaining to an enterprise is obtained from one or more data sources. For example, in an embodiment, when the enterprise is an IT organization, information pertaining to infrastructure components may be obtained. In another embodiment, when the enterprise is an IT organization, information pertaining to employees may be obtained. At step 204, one or more entities are extracted from the information, and relationships across the one or more entities may be identified. For example, one or more entities may comprise but are not limited to one or more applications, one or more software servers, one or more hardware servers, location information, one or more databases, one or more users, and the like). The relationships of these entities are further identified. For example, relationships may comprise but are not limited to, the one or more applications residing in at least one of the one or more software servers, and the one or more hardware servers. Relationships may further include, for example, how the connections are between the one or more entities, and the dependencies across the entities. Relationships may further include which of the one or more users access the one or more applications residing in at least one of the one or more software servers, and the one or more hardware servers, and how are the one or more users (e.g., employees) connected to each other.

At step 206, conflict resolution check is performed on the information received from the one or more data sources based on one or more defined rules. The one or more rules are pre-defined and stored in the memory 102, in an example embodiment. The one or more rules may be generated in real-time, or near real-time, in another example embodiment. For example, conflict arises when, any attribute of any entity is showing conflicting values from different data sources. To resolve these conflicts, one or more rules (stored in the memory 102 or obtained in real-time from one or more external sources) are implemented (and/or executed) to understand which data source is believable (or trustworthy) than the other in context of conflicting attribute. Conflict resolution rules are defined in the descending order of belief, in one example embodiment. Performing conflict resolution check on the information may comprise identifying one or more attributes associated with the information and the one or more entities, in another example embodiment. For example, where conflicting 'phoneNumber' values if an 'employee' is coming from 'HR' as well as 'peoplesoft' data source. To resolve this conflict at the system model level, rule may be defined for example, attribute 'phoneNumber' of entity 'employee' coming from 'peoplesoft' is more believable than 'HR' for non-empty values. Similarly, conflicting 'make' values of a 'hardware server' is coming from 'Infrastructure System (IS)' as well as 'Admin' data source. To resolve this conflict at the system model level, rule may be defined for example, attribute 'make' of entity 'hardware Server' coming from 'IS' is more believable than 'Admin' for non-empty values.

Further, the step of performing conflict resolution check on the information received from the one or more data sources based on one or more pre-defined rules may comprise computing weight and assigning the weight to the one or more data sources based on the information, and identifying one or more authentic data sources from the one or more data sources based on the weight. For example, when the weight of a first data source is greater than the weight of a second data source, then the first data source may be considered (or identified) as an authentic data source. In an embodiment, the step of identifying of the one or more data sources as one or more authentic data sources may include identifying at least one of one or more instances of, and contribution by, the one or more data sources in the information to obtain the one or more authentic data sources. At step 208, one or more missing links in the Information are identified. At step 210 a completeness score is computed for the information based on at least one of the conflict resolution check being performed and the one or more missing links identified. For example, the conflict resolution check, missing links identification, and computation of completeness score is done to detect and eliminate inconsistencies. Completeness score (CE1) of data source D for entity E1 may be computed based on number of instances for entity E1 that data source D contributes and total number of instances of entity E1 in system model. Alternatively, completeness score may be expressed as follows:

Completeness score (CE1) of data source $D$ for
entity $E1$=(Number of instances for entity $E1$ that data source D contributes/Total number of instances of entity E1 in system model)*100.

Completeness score of a data source=(CE1+CE1+ CE1+ . . . +CEn)/n. Here, 'n' is total number of entities in the system model. And CEn is completeness score for data source for nth entity. In an embodiment, the completeness score for the information may be computed and/or is based the one or more instances of, and contribution by, the one or more data sources in the information.

For instance, a contact information of a first entity (e.g., a first employee) is received from (i) a second entity (e.g., a second employee) who may be in a same project as the first employee, and a third entity (e.g., a friend or a family member of the first entity), the blueprint generation system 100 may compute and assign a higher weight (or a higher score) to the third entity and prioritize the contact information received from the third entity over the second entity. Similarly, the blueprint generation system 100 may also identify instances of, and contribution by, the second entity and the third entity (which in this case can be the data sources) in the information. For example, if the second entity, who is an employee and in the same project as the first entity, may have provided the first entity's present address only once, whereas the third entity who is a family member, may be provided both the present address, permanent address, and other personal information including the contact information associated with the first entity thrice. In such scenario, the blueprint generation system 100 may consider the third entity as an authentic data source, since the rate of instances and contribution of the third entity is higher than the instances and contribution of the second entity. Further, the blueprint generation system 100 may also compute a completeness score for the information shared by the second entity and the third entity. Since the second entity has only shared the contact information for once, the blueprint generation system 100 may compute a completeness score as 35%. Since the third entity has shared the present address, permanent address, and other personal information including the contact information associated with the first entity, the blueprint generation system 100 may compute a completeness score (e.g., 95%) that is greater than the completeness score of the second entity and its information. The blueprint generation system 100 may then communicate this additional information (e.g., the present address, permanent address, and other personal information including the contact information) to the second entity to update the additional information of the first entity. This ensures that the information is up to date not only with the blueprint generation system 100 but also with the data sources who share information associated with the one or more entities.

The blueprint generation system 100 may perform similar comparison for components for example, servers, software applications, databases, and the like, where each of the components can act as a data source and share information of other components (e.g., connectivity, component identifier, nature of service of the components, dependencies across components, and users, and the like), and identify instances of, and contribution by each of the components, and accordingly validate and verify the information, compute completeness score (and if required assign weight based on similarity of information received from one or more components), thereby ensuring the information is complete or up to date and correct. The blueprint generation system 100 may further communicate this information to each of the components to be updated in corresponding databases, or one or more memories associated with them.

At step 212, a blueprint of the information and the one or more entities is generated for the enterprise based on at least one of the conflict resolution check being performed, the one or more missing links being identified, and the completeness score being computed. In an embodiment, the blueprint generation system 100 may generate the blueprint with the information and the one or more entities for the enterprise based on instances of, and contribution by the one or more authentic data sources. The method may further include generating a feedback report and communicating the feedback report to the one or more data sources. In an embodiment, the feedback report is based on at least one of the completeness score computed for the information, relationships across the one or more entities, one or more instances of, and contribution by the one or more data sources. This enables the one or more data sources to obtain corrected information from the system 100 thereby allowing the one or more data sources to correct information at their end with the corrected information provided by the system 100. The data sources then update their information with the correction information provided by the system 100 to ensure consistency, and accuracy. The generated blueprint may be periodically (or continually) updated based on subsequent information received from a set of data sources. In one embodiment, the set of data sources may comprise at least a portion of the one or more data sources (e.g., a subset of the one or more data sources). In another embodiment, when the generated blueprint is periodically (or continually) updated the data sources may be different from the earlier set of data sources. For instance, the blueprint may be generated using a first set of data sources. The blueprint may be updated using a second set of data sources which are different from the first set of data sources. Therefore, the updated blueprint may vary from the previously generated blueprint for the same enterprise, and may have multiple blueprints generated for the same enterprise. Further, the updated blueprint may have at least a portion of the previously generated blueprint, or may be entirely different based on at least one of one or more infrastructure components, entities, data sources, information received, and the like. In an embodiment, the blueprint generation system 100 configures data sources by using one or more adapters, further maps the data sources to a system model which enables extract of entities and relationships, detect and eliminate inconsistencies, resolve attribute conflicts, identify missing links, evaluate completeness, and the like.

Alternatively, the blueprint generation system 100 may execute the modules 108 comprising an extraction module that when executed by the hardware processor 104 obtains and processes information pertaining to an enterprise from one or more data sources, and extracts one or more entities from the information, and identifying relationships across the one or more entities. The modules 108 may further include a conflict resolution check module that when executed by the hardware processor 104 performs conflict resolution check on the information received from the one or more data sources based on one or more pre-defined rules. The conflict resolution check module performs a conflict resolution check and identifies one or more attributes associated with the information and the one or more entities. The modules 108 may further include an identification module that when executed by the hardware processor 104 identifies one or more missing links in the information. The modules 108 may further include a completeness score computation module that when executed by the hardware processor 104 computes a completeness score for the information based on at least one of the conflict resolution check and the one or more missing links. The modules 108 may further include a blueprint generation module that when executed by the hardware processor 104 generates a blueprint of the information and the one or more entities for the enterprise.

The modules 108 may further include a weight computation module that when executed by the hardware processor 104 computes weight and assigns the weight to the one or more data sources based on the information, and further identifies one or more authentic data sources from the one or more data sources based on the weight. The identification module when executed by the hardware processor 104 further identifies at least one of one or more instances of, and contribution by, the one or more data sources in the information to obtain the one or more authentic data sources based on the assigned computed weights. The completeness score computation module computes completeness score based the one or more instances of, and contribution by, the one or more data sources in the information.

The modules 108 may further include a report generation module that when executed by the hardware processor 104 generates a feedback report and communicates the feedback report to the one or more data sources. The feedback report is based on (or comprises) at least one of the completeness score computed for the information, relationships across the one or more entities, one or more instances of, and contribution by the one or more data sources. In one embodiment, the feedback report may further include information for example, missing links, conflict resolution check data, and the like that increases the update of data at the one or more data sources to ensure consistency and accuracy across entities. The modules 108 may further include an update module that when executed by the hardware processor 104 updates the blueprint based on subsequent information received from a set of data sources wherein the set of data sources comprises at least a portion of the one or more data sources.

The modules 108 for example, the extraction module, the conflict resolution check module, the identification module, the completeness score computation module, the blueprint generation module, the weight computation module, the report generation module, and the update module are implemented as at least one of a logically self-contained part of a software program, a self-contained hardware component, and/or, a self-contained hardware component, with a logically self-contained part of a software program embedded into each of the hardware component that when executed perform the above method(s) described herein, in one embodiment.

Figure 3:
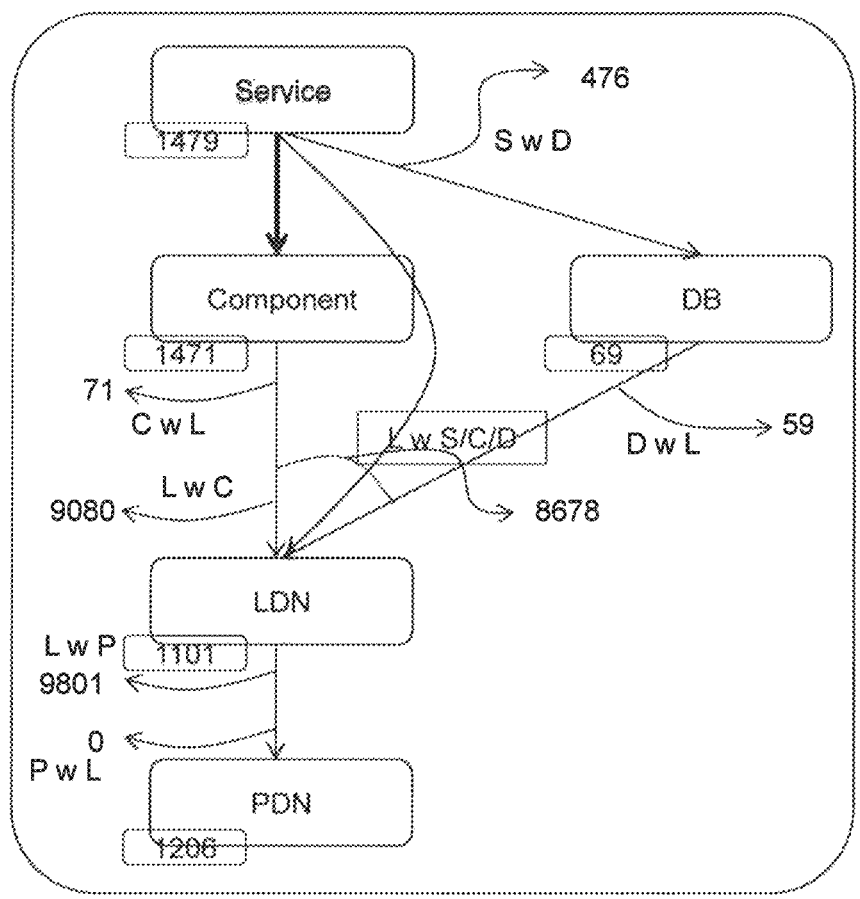
FIG. 3 is a schematic diagram illustrating identifying missing links using the blueprint generation system of FIG. 1 according to an embodiment of the present disclosure.

FIG. 3, with reference to FIGS. 1 and 2, is a schematic diagram illustrating identifying missing links according to an embodiment of the present disclosure. As depicted in FIG. 3, SwD refers to service without database. It is evident from FIG. 3, that 476 out of 1479 services do not have information about which database it is associated with. Similarly, DwL refers to database without Local Distinguished Name (LDN). As can be seen from FIG. 3, 59 out of 69 databases do not have information about which LDN it is hosted on.

Figure 4:
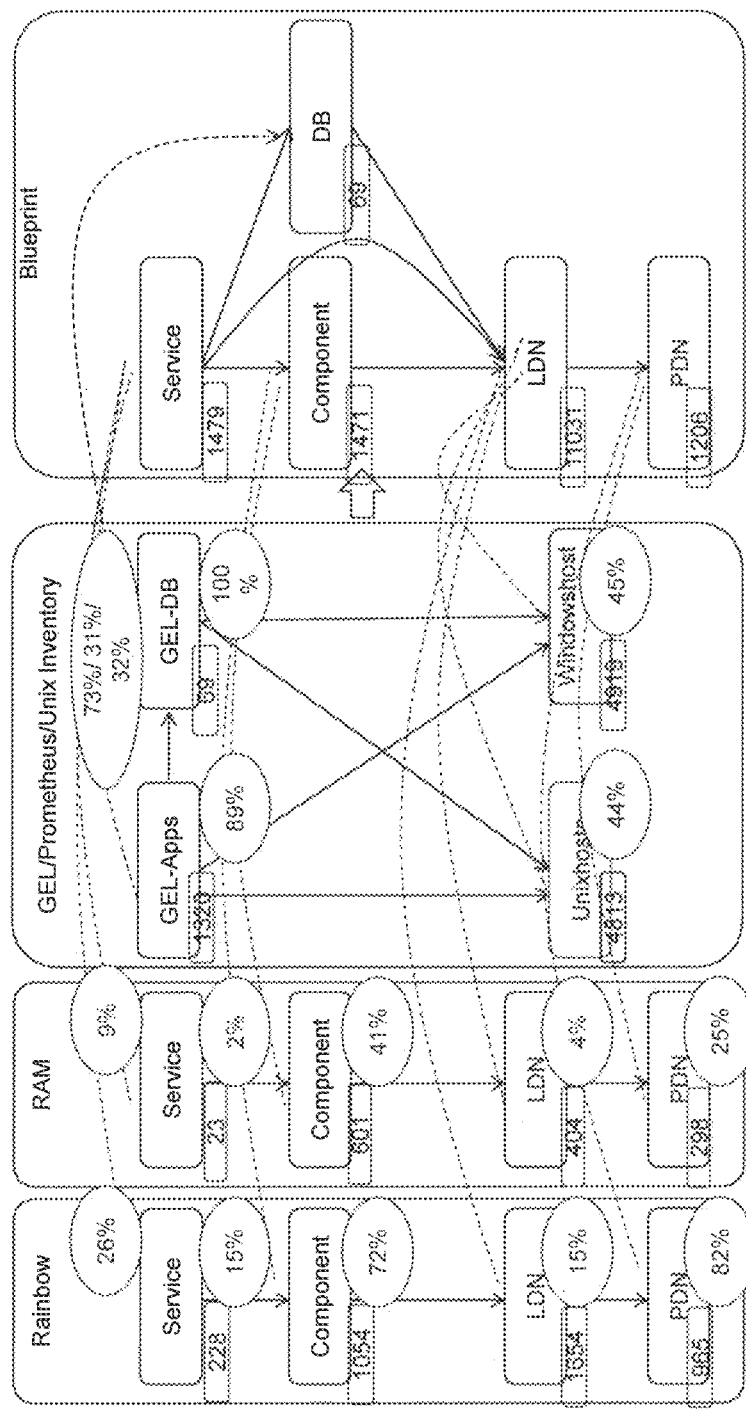
FIG. 4 depicts a blueprint generation by the blueprint generation system of FIG. 1 based on the information obtained from the one or more data sources according to an embodiment of the present disclosure.

FIG. 4, with reference to FIGS. 1 through 3, depicts a blueprint generation by the blueprint generation system 100 based on the information obtained from the one or more data sources according to an embodiment of the present disclosure. As can be seen from FIG. 4, the blueprint generated based on the information obtained from data sources, also depicts completeness of information. For example, for Rainbow as a data source, the service component (or entity) has completeness score of 26%. Similarly, the entity Parent distinguished name (PDN) comprises information that ensures 86% completeness. Similarly, FIG. 4 depicts various other data sources (e.g., RAM, GEL Prometheus/Unix Inventory), and corresponding entities, and information from these data sources which further indicate the completeness score.

Figure 5A:
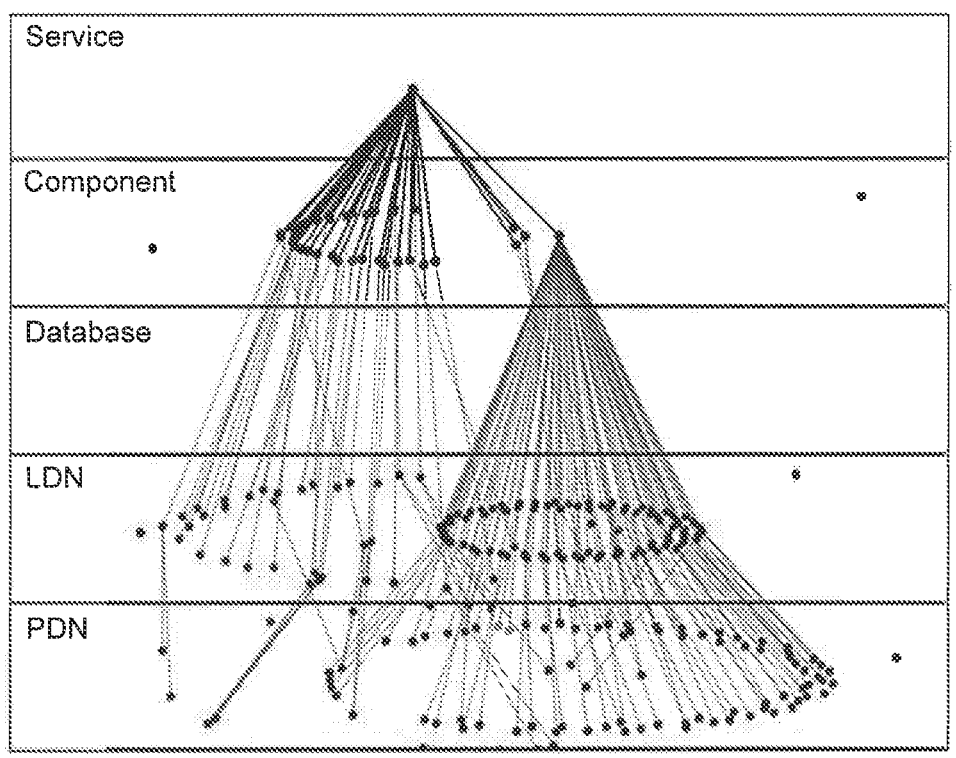
FIG. 5A is a graphical representation that illustrates technology consumption of an application according to an embodiment of the present disclosure.

FIG. 5A, with reference to FIGS. 1 through 4, is a graphical representation that illustrates technology consumption of an application according to an embodiment of the present disclosure. FIG. 5B, with reference to 5A, depicts summary and attributes of the application according to an embodiment of the present disclosure. More particularly, FIG. 5B depicts a summary field and attributes field for a credit authority application. In an embodiment, the summary field may include one or more entities for example, pdn, component, Idn, service, etc., and corresponding count, for example, 96, 39, 124, and 1. In an embodiment, the attributes field may include and one or more attributes for example, but are not limited to, attributed identifier (id), nodename, display name, sources, service name, catalog id, locality, and unit. The attributes field may further include corresponding value for the attributes. For example, the value of attribute identifier is 840. The value of attributes code name, display name, and service name is credit authority. Similarly, the value of attribute sources is at least one of rainbow, gel, and ram. The value of locality is global, and the value of unit is corporate banking gts.

Figure 6:
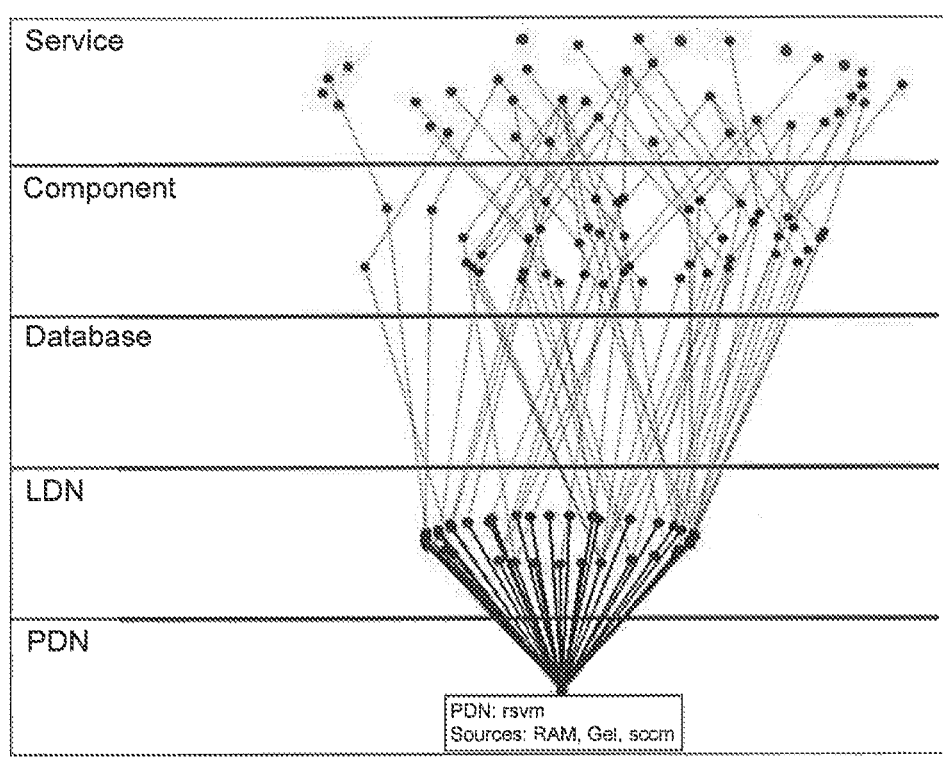
FIG. 6 is a graphical representation that illustrates impact analysis using the blueprint generated by the blueprint generation system of FIG. 1 according to an embodiment of the present disclosure.

FIG. 6, with reference to FIGS. 1 through 5B, is a graphical representation that illustrates impact analysis (or risk analysis) using the blueprint generated by the blueprint generation system 100 according to an embodiment of the present disclosure. More particularly, FIG. 6 illustrates impact analysis of one or more services and components that are impacted or affected by a server (e.g., rsvm server). In an embodiment, one or more batches may be processed at a specific time interval (e.g., every month end), to determine impact analysis and further identify critical entities, and the like. Based on the graphical representation, the blueprint generation system 100 enables identification of Critical Entities/Paths, impact analysis, change management, and the like.

FIG. 7, with reference to FIGS. 1 through 6, is a table view illustrating identifying attribute conflicts by performing conflict resolution check using the blueprint generation system 100 according to an embodiment of the present disclosure. As can be seen from FIG. 7, for an entity Idn, corresponding node is mmlsdsd, and attribute name is osversion. The blueprint generation system 100 has identified a conflict in attribute from data sources Rainbow and GEL. The conflict in attribute is type of operating system. For example, the data source Rainbow provides Win 10 as operating system for the entity Idn, whereas the other data source GEL provides Linux as operating system for the same entity Idn. Similarly, in another example, the blueprint generation system 100 has identified a conflict in attribute from data sources Rainbow and GEL. The conflict in attribute is type of manufacturer. For example, the data source Rainbow provides HP as manufacturer for an entity pdn, whereas the other data source GEL provides DELL as manufacturer for the same entity pdn. Similarly, in yet another example, the blueprint generation system 100 has identified a conflict in attribute from data sources Rainbow and GEL. The conflict in attribute is type of business area. For example, the data source Rainbow provides credit cards as business area for an entity service, whereas other data source RAM provides debit cards as business area for the same entity service. Although, the embodiments of the present disclosure depict blueprint generation for an enterprise such as an IT organization, it is to be understood to a person having ordinary skill in the art, the embodiments disclosed herein are not limited to blueprint generation for an enterprise such as an IT organization and can be extended to any other entity/institute, or systems.

The blueprint generation system 100 was tested by obtaining information from 14 data sources, identifying 11 entities, and 12 relationships, in which 743216 conflicts arose from 71472 nodes and 197 attributes. This further was analysed which involved 10,000 applications, more than 100,000 infrastructure components, and approximately 250,000 relationships.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure provide a blueprint generation system 100 enables generation of modeler reports that include data source completeness reports, attribute conflicts reports, missing links reports, analyzer reports, End-of-life reports (entities nearing license expiry), non-compliance reports, decommissioning reports (entities that are not in use), application/service-specific reports, technology consumption reports, impact analysis reports, slice-and-dice reports with various filters on entities and attributes. Typically, information may be partial from a data source either in the form of structured data, unstructured data, or semi structured, the blueprint generation system 100 identifies incorrect information, conflicting information which requires expert's to resolve conflict, incomplete Data Sources, missing entities and relationships. The generated blueprint enables to connect the dots between business, application, infrastructure, human resources, and support operations by analyzing the blueprint to generate a variety of reports as described above. Since changes are inevitable in an enterprise, the embodiments of the present disclosure enables to keep information specific to Businesses, technologies, Regulations, Policies, and the like up-to-date. The generated blueprint enables differentiate and merging existing CMDB with new updates, maintain data lineage, and further identify what is changed, when it was changed, and who has changed.

Further, the embodiments of the present disclosure enables the blueprint system 100 to captures dependencies, alerts, tickets, metrics, business operations, human actions, and the like. Moreover, the embodiments of the present disclosure further enables the updation of blueprint (periodically and/or dynamically) to maintain the configuration repository to current, thereby enabling an end-to-end automation by tapping into heterogeneous data sources generated from various discovery and one or more monitoring tools. This enables effective and optimal utilization of resources (or components of an infrastructure) which also results in low-memory consumption and processing time of the resources.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and BLU-RAY.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including Instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
    obtaining information pertaining to an enterprise from one or more data sources;
    extracting one or more entities from said information, and identifying relationships across said one or more entities;
    performing conflict resolution check on said information received from said one or more data sources based on one or more pre-defined rules;
    identifying one or more missing links in said information;
    computing a completeness score for said information based on at least one of said conflict resolution check and said one or more missing links, wherein said completeness score for said information is based on one or more instances of, and contribution by, said one or more data sources in said information; and
    generating a blueprint of said information and said one or more entities for said enterprise.

2. The processor-implemented method of claim 1, wherein performing conflict resolution check on said information received from said one or more data sources based on one or more pre-defined rules comprises
    computing weight and assigning said weight to said one or more data sources based on said information; and
    identifying one or more authentic data sources from said one or more data sources based on said weight.

3. The processor-implemented method of claim 2, wherein identifying one or more authentic data sources from said one or more data sources based on said weight comprises identifying at least one of said one or more instances of, and contribution by, said one or more data sources in said information to obtain said one or more authentic data sources.

4. The processor-implemented method of claim 1, further comprising generating a feedback report and communicating said feedback report to said one or more data sources, wherein said feedback report is based on at least one of said completeness score computed for said information, relationships across said one or more entities, said one or more instances of, and contribution by said one or more data sources.

5. The processor-implemented method of claim 1, further comprising updating said blueprint based on subsequent information received from a set of data sources, wherein said set of data sources comprises at least a portion of said one or more data sources.

6. The processor-implemented method of claim 1, wherein performing conflict resolution check on said information comprises identifying one or more attributes associated with said information and said one or more entities.

7. A processor-implemented system, comprising:
    a memory storing instructions;
    a communication network interface; and
    one or more hardware processors coupled to said memory, wherein said one or more hardware processors configured by said instructions to:
        obtain information pertaining to an enterprise from one or more data sources;
        extract one or more entities from said information, and identify relationships across said one or more entities;
        perform conflict resolution check on said information received from said one or more data sources based on one or more pre-defined rules;
        identify one or more missing links in said information;
        compute a completeness score for said information based on at least one of said conflict resolution check and said one or more missing links, wherein said completeness score for said information is based on one or more instances of, and contribution by, said one or more data sources in said information; and
        generate a blueprint of said information and said one or more entities for said enterprise.

8. The processor-implemented system of claim 7, wherein conflict resolution check is performed by
    computing weight and assigning said weight to said one or more data sources based on said information; and
    identifying one or more authentic data sources from said one or more data sources based on said weight.

9. The processor-implemented system of claim 8, wherein said one or more authentic data sources are identified by identifying at least one of said one or more instances of, and contribution by, said one or more data sources in said information to obtain said one or more authentic data sources.

10. The processor-implemented system of claim 7, wherein said one or more hardware processors are further configured by said instructions to generate a feedback report and communicating said feedback report to said one or more data sources, wherein said feedback report is based on at least one of said completeness score computed for said information, relationships across said one or more entities, said one or more instances of, and contribution by, said one or more data sources.

11. The processor-implemented system of claim 7, wherein said one or more hardware processors are further configured by said instructions to update said blueprint based on subsequent information received from a set of data sources, wherein said set of data sources comprises at least a portion of said one or more data sources.

12. One or more non-transitory machine readable information storage mediums comprising one or more instructions which when executed by one or more hardware processors causes:
    obtaining information pertaining to an enterprise from one or more data sources;
    extracting one or more entities from said information, and identifying relationships across said one or more entities;
    performing conflict resolution check on said information received from said one or more data sources based on one or more pre-defined rules;
    identifying one or more missing links in said information;
    computing a completeness score for said information based on at least one of said conflict resolution check and said one or more missing links, wherein said completeness score for said information is based on one or more instances of, and contribution by, said one or more data sources in said information; and
    generating a blueprint of said information and said one or more entities for said enterprise.

13. The one or more non-transitory machine readable information storage mediums of claim 12, wherein performing conflict resolution check on said information received from said one or more data sources based on one or more pre-defined rules comprises
    computing weight and assigning said weight to said one or more data sources based on said information; and
    identifying one or more authentic data sources from said one or more data sources based on said weight.

14. The one or more non-transitory machine readable information storage mediums of claim 13, wherein identifying one or more authentic data sources from said one or more data sources based on said weight comprises identifying at least one of said one or more instances of, and contribution by, said one or more data sources in said information to obtain said one or more authentic data sources.

15. The one or more non-transitory machine readable information storage mediums of claim 12, wherein said one or more instructions which when executed by said one or more hardware processors further causes generating a feedback report and communicating said feedback report to said one or more data sources, wherein said feedback report is based on at least one of said completeness score computed for said information, relationships across said one or more entities, said one or more instances of, and contribution by said one or more data sources.

16. The one or more non-transitory machine readable information storage mediums of claim 12, wherein said one or more instructions which when executed by said one or more hardware processors further causes updating said blueprint based on subsequent information received from a set of data sources, wherein said set of data sources comprises at least a portion of said one or more data sources.

17. The one or more non-transitory machine readable information storage mediums of claim 12, wherein performing conflict resolution check on said information comprises identifying one or more attributes associated with said information and said one or more entities.

* * * * *